(12) United States Patent
Ojard et al.

(10) Patent No.: US 6,625,459 B1
(45) Date of Patent: Sep. 23, 2003

(54) METHOD AND APPARATUS FOR EFFICIENT DETERMINATION OF CHANNEL ESTIMATE AND BAUD FREQUENCY OFFSET ESTIMATE

(75) Inventors: Eric Ojard, San Francisco, CA (US); Alan Corry, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 439 days.

(21) Appl. No.: 09/585,774

(22) Filed: Jun. 2, 2000

Related U.S. Application Data
(60) Provisional application No. 60/138,102, filed on Jun. 4, 1999.

(51) Int. Cl.$^7$ ................................................. H04Q 7/20
(52) U.S. Cl. ........................ 455/464; 455/405; 455/516
(58) Field of Search ................................. 455/450, 464, 455/504, 506, 509, 62, 63, 67.4, 403, 455, 456, 516; 370/292, 421, 321, 513, 350, 503, 510–514; 375/231, 365–369

(56) References Cited

U.S. PATENT DOCUMENTS 5,255,291 A * 10/1993 Holden et al. ................. 375/37
5,343,498 A * 8/1994 Toy et al. ...................... 375/37

(List continued on next page.)

FOREIGN PATENT DOCUMENTS

WO WO 98/10531 9/1996

OTHER PUBLICATIONS

Sandell, "Iterative channel estimation using soft decision feedback", Sep. 1998, 0–7803–4984–9/98 IEEE.*

(List continued on next page.)

Primary Examiner—Edward F. Urban
Assistant Examiner—C. Chow
(74) Attorney, Agent, or Firm—Christie, Parker & Hale, LLP

(57) ABSTRACT

A method and apparatus for obtaining a channel estimate and a baud frequency offset estimate for a communications channel in a communications system. The communications system has a transmitter for transmitting to a receiver over the communications channel signals representing data appended to a preamble signal. The preamble signal is provided as a periodic plurality of preamble sequences, each preamble sequence being generated in accordance with:

$$\frac{1}{32}\sum_{k=0}^{15} b_k b^*_{\text{mod}(k+n,16)} = \begin{cases} 1, & n = 0 \\ 0, & n \neq 0 \end{cases}.$$

A signal representing the periodic plurality of preamble sequences is sent by a transmitter over the communications channel to a receiver and is received at the receiver as a received signal. The received signal is processed to determine from the received signal both a channel estimate in accordance with:

$$\hat{h} = \frac{1}{64} B^H (y_1 + y_2),$$

wherein B represents a matrix of preamble symbol values, upsampled by four and zero-filled, and y1 and y2 are column vectors of received samples, and a baud frequency offset estimate $\Delta f_b$ in accordance with:

$$S = \sum_{k=0}^{63} y_k y^*_{k+64}$$

$$\Delta f_b \cong \frac{\text{real}(S) \cdot f_b}{\text{imag}(S) \cdot f_c \cdot 32\pi},$$

wherein $f_b$ is a baud frequency and $f_c$ is a center frequency of the transmission signal.

18 Claims, 5 Drawing Sheets

U.S. PATENT DOCUMENTS

| | | | | |
|---|---|---|---|---|
| 5,432,821 A | * | 7/1995 | Polydoros et al. | 375/340 |
| 5,450,456 A | * | 9/1995 | Mueller | 375/224 |
| 5,790,598 A | * | 8/1998 | Moreland et al. | 345/233 |
| 6,084,862 A | * | 7/2000 | Bjork et al. | 370/292 |
| 6,130,894 A | * | 10/2000 | Ojard et al. | 370/421 |
| 6,331,976 B1 | * | 12/2001 | Sriram | 370/350 |
| 6,418,175 B1 | * | 7/2002 | Pukkila et al. | 375/347 |

OTHER PUBLICATIONS

John C. L. Ng, et al., "Complex Optimal Sequences with Constant Magnitude for Fast Channel Estimation Initialization," *IEEE Trans Comm*, Mar. 1998, pp. 305–308, vol. 46, No. 3.

Simon Haykin, "Chapter 11, Method of Least Squares," *Adaptive Filter Theory, 3$^{rd}$ Edition*, 1996, pp. 483–501, Prentice–Hall, Inc.

Alfred Baier, "Correlative and Iterative Channel Estimation in Adaptive Viterbi Equalizers for TDMA Mobile Radio Systems," *ITG Fachberichte, VDE Verlag*, Apr. 12, 1989, pp. 363–368, No. 107, Berlin, Germany. (XP–002077505).

Magnus Sandell, et al., "Iterative Channel Estimation Using Soft Decision Feedback," *IEEE Global Telecommunications Conference*, Nov. 8, 1998, pp. 3728–3733, New York, New York. (XP–000805320).

Khalid A. Hamied, "A New Channel Estimator for Fast Start–Up Equalization," *IEEE Transactions on Communications*, Feb. 1, 1991, pp. 177–181, vol. 39, No. 2, New York, New York. (XP–000225299).

* cited by examiner

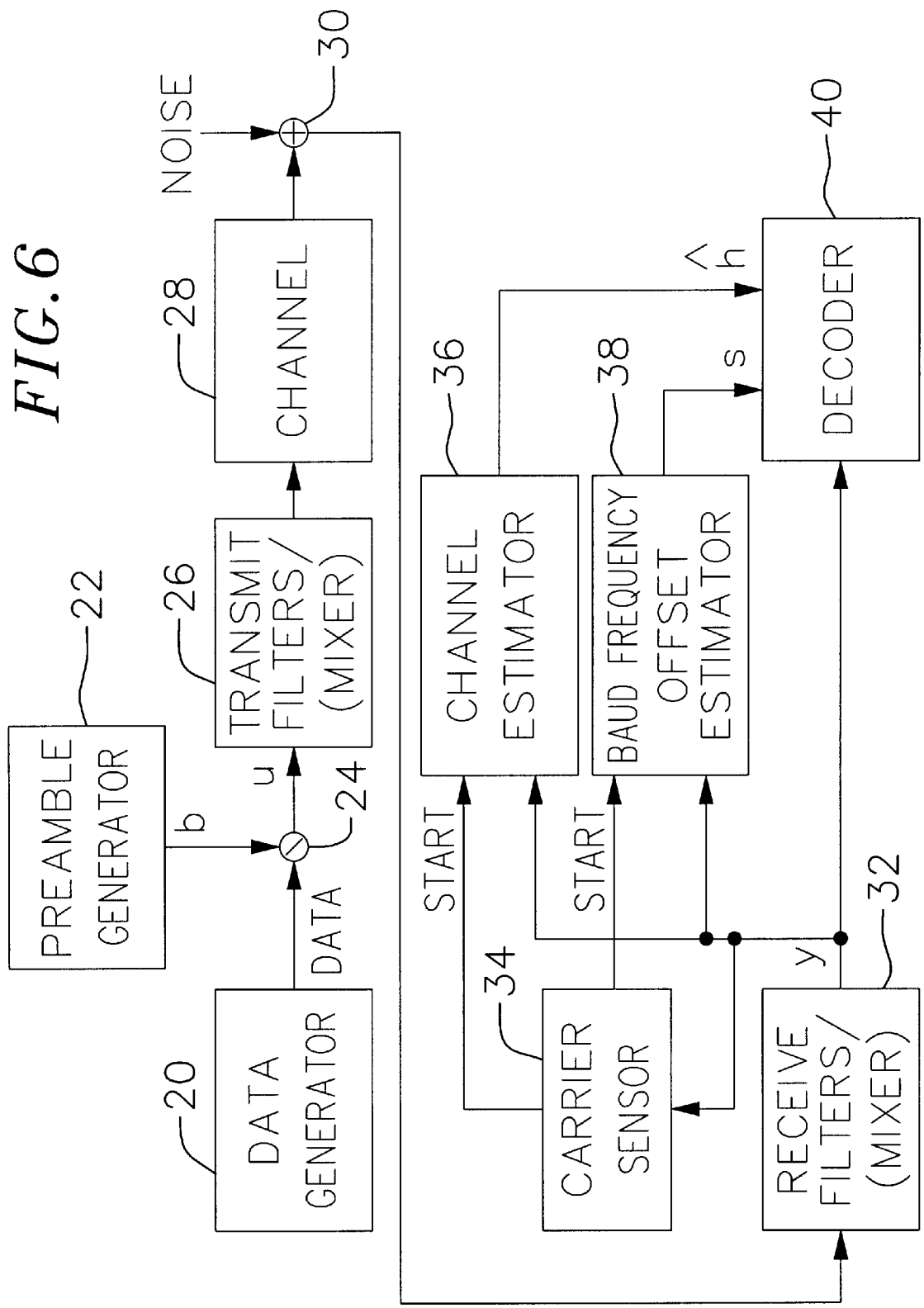

METHOD AND APPARATUS FOR EFFICIENT DETERMINATION OF CHANNEL ESTIMATE AND BAUD FREQUENCY OFFSET ESTIMATE

This application claims the benefit of provisional application Ser. No. 60/138,102 filed Jun. 4, 1999.

FIELD OF THE INVENTION

The present invention relates to communications systems in general and, more specifically, to a method and apparatus for efficiently determining a channel estimate and a baud frequency offset estimate for a communications channel between a transmitter and a receiver.

BACKGROUND OF THE INVENTION

FIGS. 1–2 respectively show models of a typical Quadrature Amplitude Modulation (QAM) transceiver 10 and a typical Carrierless Amplitude-Phase (CAP) transceiver 12 on a communications channel. Assuming perfect synchronization of the transmitter and receiver, a system may be modelled by the equation v=u*h+n (shown diagrammatically in FIG. 3), wherein v is the complex received signal, u is a transmitted complex symbol sequence, h is a complex channel model, and n is a complex noise signal. The complex noise signal is not assumed to be a white noise signal.

One goal of a characterization of a channel is to find a channel estimate, $\hat{h}$, that minimizes the expectation value (EV) of the difference between any given received signal and the expected signal. One formula for EV is shown as Equation 1.

$$EV = E\{|v - u*\hat{h}|^2\} \quad \text{(Equ. 1)}$$

Once known, channel estimate $\hat{h}$ can be used by a decoder for determining the appropriate decoder parameters, such as equalizer coefficients.

Further, in a real system, the clocks at the transmitter and receiver are not perfectly synchronized. The difference between the frequency of the transmitter's clock and the receiver's clock is called the baud frequency offset. Typically, the receiver would use some type of a timing recovery loop to track the differences in clock rates. To optimize performance in a packet-based demodulator, it's valuable to also have an estimate of the baud frequency offset to initialize the timing recovery loop before starting demodulation of the packet.

Optimal sequences for obtaining channel estimates have long been understood. See, for example, J. Letaief and R. D. Murch's, "Complex Optimal Sequences with Constant Magnitude for Fast Channel Estimation Initialization", IEEE Trans. Comm., vol. 46, no3, p. 305–308, March 1998, and Simon Haykin's "Adaptive Filter Theory, $3^{rd}$ Edition", Prentice-Hall, Inc. 1996, p 498. However, many methods for channel estimation require high computational complexity or a long preamble, or they don't offer a convenient means of also obtaining an estimate of the baud frequency offset.

Therefore, a need exists for an efficient method and apparatus for determining both the channel estimate and the baud frequency offset estimate. The present invention provides such method and apparatus, wherein a type of preamble sequence and a computational structure obtains both a channel estimate and a baud frequency offset estimate using a minimal number of preamble symbols and having a very low computational complexity.

SUMMARY OF THE INVENTION

In accordance with the present invention, an efficient method and apparatus for obtaining a channel estimate and a baud frequency offset estimate for a communications channel in a communications system is provided. The communications system has a transmitter for transmitting to a receiver over the communications channel signals representing data appended to a preamble signal. The preamble signal is provided as a periodic plurality of preamble sequences, each preamble sequence being generated in accordance with:

$$\frac{1}{32}\sum_{k=0}^{15} b_k b^*_{\text{mod}(k+n,16)} = \begin{cases} 1, & n=0 \\ 0, & n \neq 0 \end{cases}.$$

A transmission signal representing the periodic plurality of preamble sequences prepended to the data is sent by a transmitter over the communications channel to a receiver and is received at the receiver as a received signal. The received signal is processed to determine from the received signal both:

a) a channel estimate in accordance with:

$$\hat{h} = \frac{1}{64}B^H(y_1 + y_2)$$

wherein B represents a matrix of preamble symbol values, upsampled by four and zero-filled, and $y_1$ and $y_2$ are column vectors of received samples; and b) a baud frequency offset estimate $\Delta f_b$ in accordance with:

$$S = \sum_{k=0}^{63} y_k y^*_{k+64}$$

$$\Delta f_b \cong \frac{\text{real}(S) \cdot f_b}{\text{imag}(S) \cdot f_c \cdot 32\pi}$$

wherein $f_b$ is the baud frequency and $f_c$ is the center frequency of the transmission signal.

BRIEF DESCRIPTION OF THE DRAWINGS

FIG. 6 shows in block diagram form a CAP or QAM transceiver in accordance with the present invention.

DETAILED DESCRIPTION

Several embodiments are described herein for implementing channel characterization, 5 particularly in a packet protocol environment. As will be apparent upon reading this description, the channel characterization described herein is useful for quickly characterizing a channel, even on a packet-by-packet basis, on a communications channel that might have very nonoptimal characteristics, such as large notches in its frequency response and noise inside and outside the communications band. For example, just one specific area of use for channel characterization according to the present invention is for a high bandwidth network implemented over telephone lines or power lines that are also used for analog telephone service or AC power distribution.

One useful preamble sequence for channel estimation and baud frequency offset estimation is defined by the sixteen-symbol sequence b shown in Equation 2.

$$b = \begin{bmatrix} b_0 \\ b_1 \\ \vdots \\ b_{15} \end{bmatrix} = \begin{bmatrix} 1+i \\ -1-i \\ -1-i \\ -1-i \\ 1+i \\ 1-i \\ 1+i \\ -1+i \\ 1+i \\ 1+i \\ -1-i \\ 1+i \\ 1+i \\ -1+i \\ 1+i \\ 1-i \end{bmatrix} \quad \text{(Equ. 2)}$$

Sequence b has the important property illustrated by Equation 3:

$$\frac{1}{32}\sum_{k=0}^{15} b_k b^*_{\mathrm{mod}(k+n,16)} = \begin{cases} 1, & n=0 \\ 0, & n\neq 0 \end{cases} \quad \text{(Equ. 3)}$$

All symbols in sequence b belong to a 4-QAM (or QPSK) constellation. In one embodiment, the preamble sequence is three copies of the sixteen-symbol sequence, referred to herein as the first, second, and third copies, respectively. In one variation, an extra copy of the sixteen-symbol sequence is prepended to the preamble to allow settling time for an adaptive gain control. This extra copy is referred to as the zeroth copy. The presence or absence of the zeroth copy does not affect the operations of channel estimation and baud frequency offset estimation. With multiple copies, one copy can be compared to another copy, to further characterize the channel.

Figure 4A:
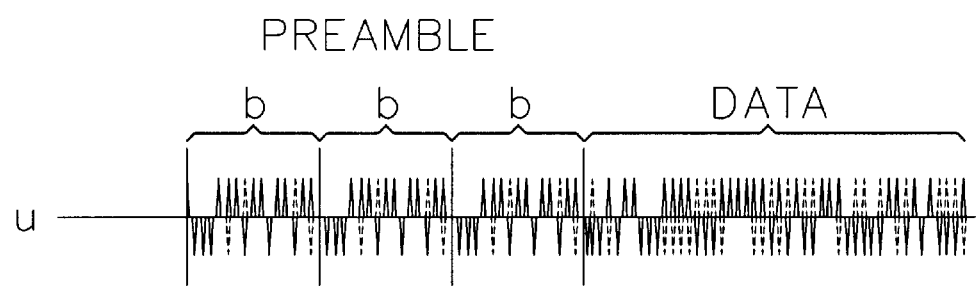
FIGS. 4a, 4b and 4c show respectively the u, h and v signals in accordance with the present invention wherein the preamble includes three periodic copies of b.
Figure 4B:
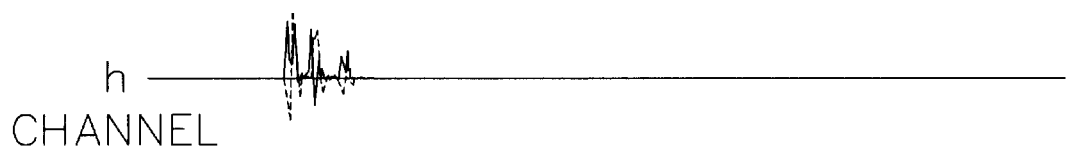
Figure 4C:
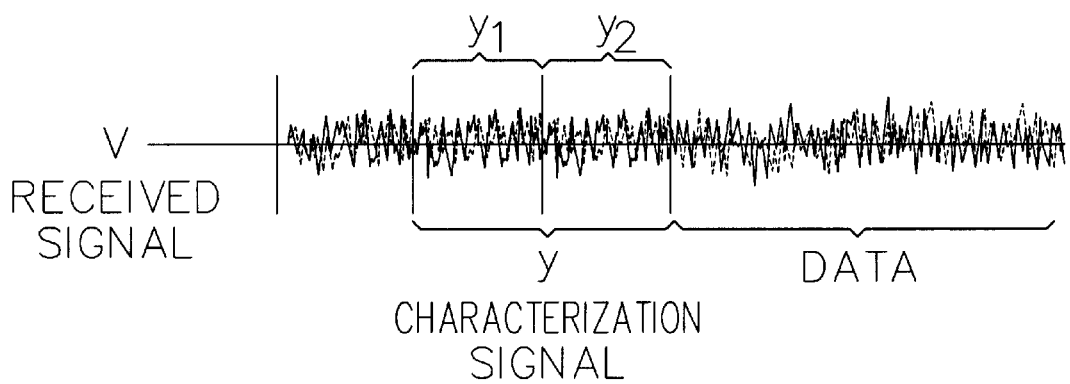
Figure 5A:
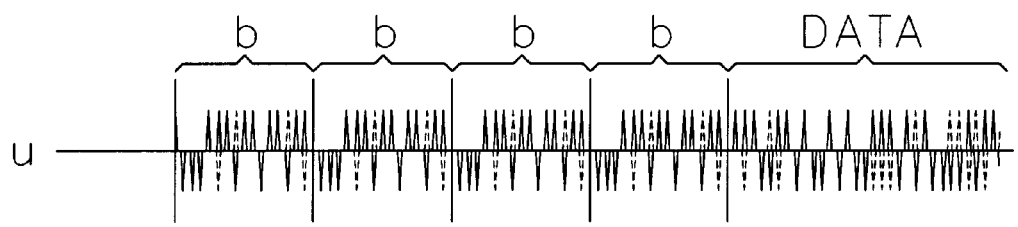
FIGS. 5a, 5b and 5c show respectively the u, h and v signals in accordance with the present invention wherein the preamble includes four periodic copies of b.
Figure 5B:
Figure 5C:
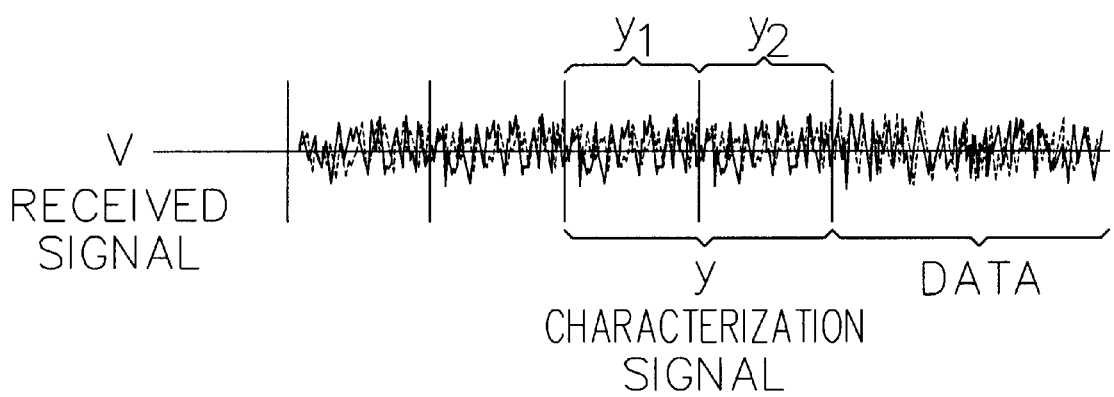

The second and third copies of preamble in the received signal form a "characterization signal". The characterization signal is the part of the received signal used for channel estimation and baud frequency offset estimation, as illustrated in FIGS. 4–5. The start of the characterization signal might be found by waiting a fixed time interval after detecting the start of the signal. The start of the signal may be detected in a number of ways. The simplest way is to compare the magnitude of the input signal to a preset threshold, declaring the start of the signal when the threshold is exceeded. To function at lower signal-to-noise ratios, a matched filter could be used at the input to a comparator, where the filter is matched to the known preamble symbols. This would produce large magnitude outputs only when the input signal resembles the known preamble sequence, reducing the susceptibility to false-triggers in high-noise conditions. While such techniques may be used to increase the range of operating conditions, they are not necessary to practice the invention described herein.

A method for channel estimation will now be described. The result of this method is a complex channel estimate. In one example, the complex channel estimate is sampled at four times the baud frequency of the preamble signal and the complex input signal is also sampled at four times the baud frequency of the preamble signal.

In the following description, the symbol B represents a matrix of preamble symbol values, upsampled by four and zero-filled, as shown below:

$$B^H = \begin{bmatrix} b_0^* & 0 & 0 & 0 & b_1^* & 0 & 0 & 0 & \ldots & b_{15}^* & 0 & 0 & 0 \\ 0 & b_0^* & 0 & 0 & 0 & b_1^* & 0 & 0 & \ldots & 0 & b_{15}^* & 0 & 0 \\ 0 & 0 & b_0^* & 0 & 0 & 0 & b_1^* & 0 & \ldots & 0 & 0 & b_{15}^* & 0 \\ 0 & 0 & 0 & b_0^* & 0 & 0 & 0 & b_1^* & \ldots & 0 & 0 & 0 & b_{15}^* \\ b_{15}^* & 0 & 0 & 0 & b_0^* & 0 & 0 & 0 & \ldots & b_{14}^* & 0 & 0 & 0 \\ 0 & b_{15}^* & 0 & 0 & 0 & b_0^* & 0 & 0 & \ldots & 0 & b_{14}^* & 0 & 0 \\ 0 & 0 & b_{15}^* & 0 & 0 & 0 & b_0^* & 0 & \ldots & 0 & 0 & b_{14}^* & 0 \\ 0 & 0 & 0 & b_{15}^* & 0 & 0 & 0 & b_0^* & \ldots & 0 & 0 & 0 & b_{14}^* \\ \vdots & \vdots & \vdots & \vdots & \vdots & \vdots & \vdots & \vdots & \ddots & \vdots & \vdots & \vdots & \vdots \\ b_1^* & 0 & 0 & 0 & b_2^* & 0 & 0 & 0 & \ldots & b_0^* & 0 & 0 & 0 \\ 0 & b_1^* & 0 & 0 & 0 & b_2^* & 0 & 0 & \ldots & 0 & b_0^* & 0 & 0 \\ 0 & 0 & b_1^* & 0 & 0 & 0 & b_2^* & 0 & \ldots & 0 & 0 & b_0^* & 0 \\ 0 & 0 & 0 & b_1^* & 0 & 0 & 0 & b_2^* & \ldots & 0 & 0 & 0 & b_0^* \end{bmatrix}$$

wherein $(\ )^H$ represents the Hermitian transpose or conjugate transpose. The upsampling could be by a factor other that four, and the adaptation of the equations set forth herein should be understood from this description. For example, with a sampling rate of six, there would be five zeroes between each $b_1$ value in B.

Let $y_1$, $y_2$ and $y$ be column vectors of received samples in the characterization signal, as follows:

$$y_1 = \begin{bmatrix} y_0 \\ y_1 \\ \vdots \\ y_{62} \\ y_{63} \end{bmatrix} \quad y_2 = \begin{bmatrix} y_{64} \\ y_{65} \\ \vdots \\ y_{126} \\ y_{127} \end{bmatrix} \quad y = \begin{bmatrix} y_1 \\ y_2 \end{bmatrix},$$

let h be a 64-sample channel expressed as:

$$h = \begin{bmatrix} h_0 \\ h_1 \\ \vdots \\ h_{62} \\ h_{63} \end{bmatrix},$$

and define the matrix A as shown:

$$A = \begin{bmatrix} B \\ B \end{bmatrix}.$$

Given the above equations, the received signal, y, is given by y=Ah+n, where n is a vector of random noise values. One goal of channel estimation is to find a channel estimate, ĥ, that minimizes $$e^2 = \|A\hat{h} - y\|^2$$

Haykin showed that the optimal channel estimate can be characterized by $$\hat{h} = (A^H A)^{-1} A^H y.$$

The preamble sequence b has the property that $$A^H A = 64 I_{64},$$

where $I_N$ represents an N by N identity matrix. Hence, $$\hat{h} = \frac{1}{64} A^H y$$
$$= \frac{1}{64} [B^H \ B^H]$$
$$= \frac{1}{64} [B^H \ B^H] \begin{bmatrix} y_1 \\ y_2 \end{bmatrix}$$
$$= \frac{1}{64} B^H (y_1 + y_2)$$

Equivalently, $$\begin{bmatrix} h_0 \\ h_1 \\ h_2 \\ h_3 \\ h_4 \\ h_5 \\ h_6 \\ h_7 \\ \vdots \\ h_{60} \\ h_{61} \\ h_{62} \\ h_{63} \end{bmatrix} = \frac{1}{32} \begin{bmatrix} b_0^* & 0 & 0 & 0 & b_1^* & 0 & 0 & 0 & \cdots & b_{15}^* & 0 & 0 & 0 \\ 0 & b_0^* & 0 & 0 & 0 & b_1^* & 0 & 0 & \cdots & 0 & b_{15}^* & 0 & 0 \\ 0 & 0 & b_0^* & 0 & 0 & 0 & b_1^* & 0 & \cdots & 0 & 0 & b_{15}^* & 0 \\ 0 & 0 & 0 & b_0^* & 0 & 0 & 0 & b_1^* & \cdots & 0 & 0 & 0 & b_{15}^* \\ b_{15}^* & 0 & 0 & 0 & b_0^* & 0 & 0 & 0 & \cdots & b_{14}^* & 0 & 0 & 0 \\ 0 & b_{15}^* & 0 & 0 & 0 & b_0^* & 0 & 0 & \cdots & 0 & b_{14}^* & 0 & 0 \\ 0 & 0 & b_{15}^* & 0 & 0 & 0 & b_0^* & 0 & \cdots & 0 & 0 & b_{14}^* & 0 \\ 0 & 0 & 0 & b_{15}^* & 0 & 0 & 0 & b_0^* & \cdots & 0 & 0 & 0 & b_{14}^* \\ \vdots & \vdots & \vdots & \vdots & \vdots & \vdots & \vdots & \vdots & \ddots & \vdots & \vdots & \vdots & \vdots \\ b_1^* & 0 & 0 & 0 & b_2^* & 0 & 0 & 0 & \cdots & b_0^* & 0 & 0 & 0 \\ 0 & b_1^* & 0 & 0 & 0 & b_2^* & 0 & 0 & \cdots & 0 & b_0^* & 0 & 0 \\ 0 & 0 & b_1^* & 0 & 0 & 0 & b_2^* & 0 & \cdots & 0 & 0 & b_0^* & 0 \\ 0 & 0 & 0 & b_1^* & 0 & 0 & 0 & b_2^* & \cdots & 0 & 0 & 0 & b_0^* \end{bmatrix} \cdot \begin{bmatrix} y_0 + y_{64} \\ y_1 + y_{65} \\ y_2 + y_{66} \\ y_3 + y_{67} \\ y_4 + y_{68} \\ y_5 + y_{69} \\ y_6 + y_{70} \\ y_7 + y_{71} \\ \vdots \\ y_{60} + y_{124} \\ y_{61} + y_{125} \\ y_{62} + y_{126} \\ y_{63} + y_{127} \end{bmatrix}$$

Figure 1:
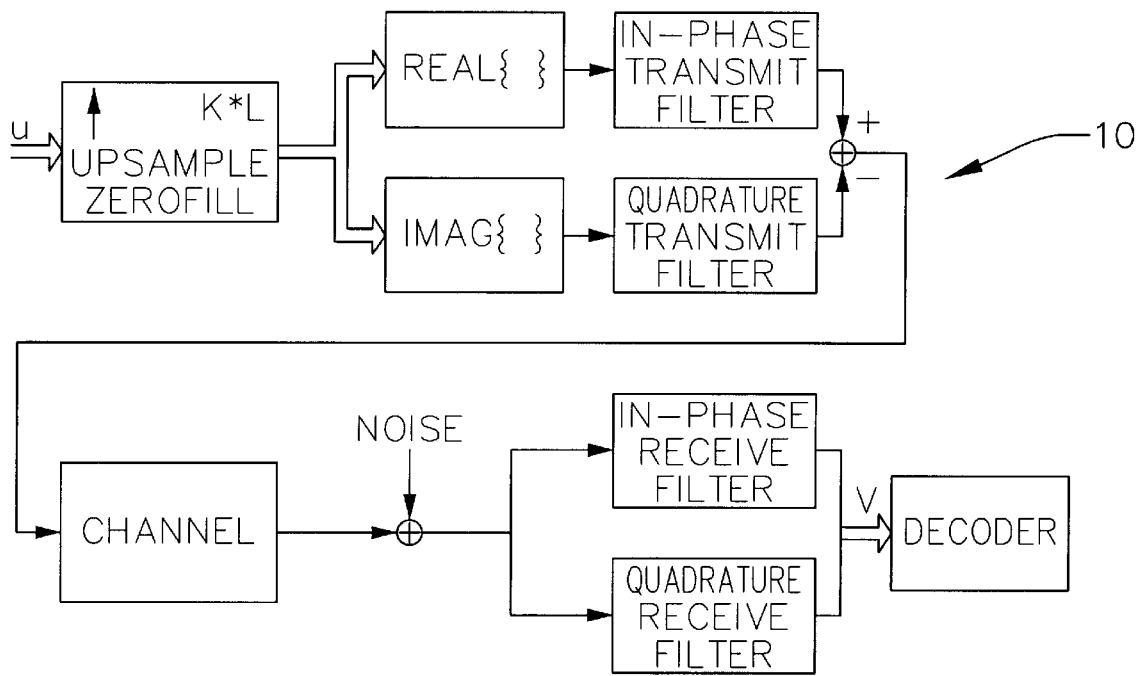
FIG. 1 shows in block diagram form a typical CAP transceiver system in which the present invention can be implemented.
Figure 2:
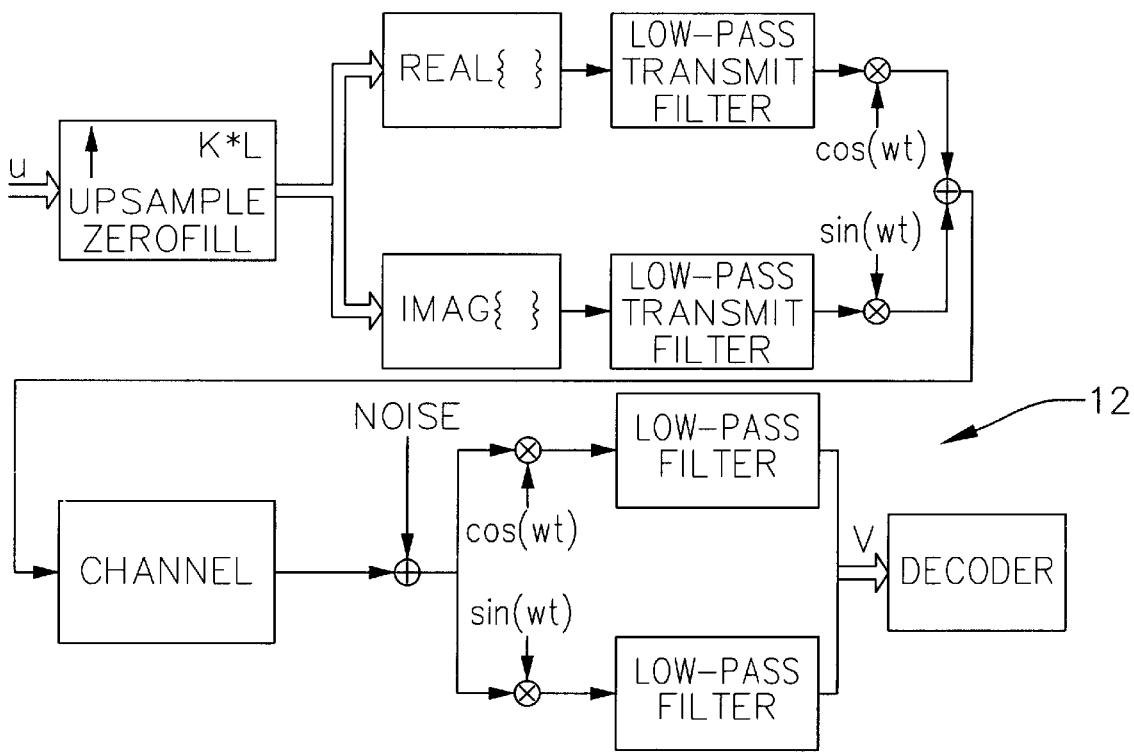
FIG. 2 shows in block diagram form a typical QAM transceiver system in which the present invention can be implemented.
Figure 3:
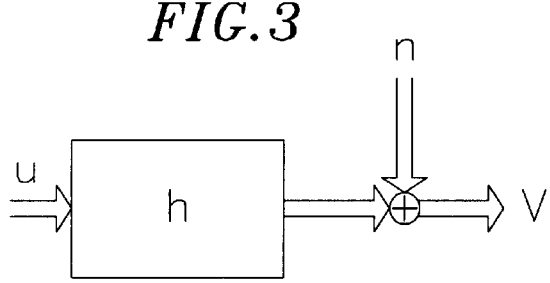
FIG. 3 shows in block diagram form an equivalent model of a CAP or QAM transceiver system of FIGS. 1 or 2.

Referring to FIG. 6, a transceiver in accordance with the present invention is depicted. Data generator 20 provides a serial modulated data stream in accordance with standard data generation techniques. Preamble generator 22 transmits the b symbol preambles as described above and combines at serial switch 24 to form serial stream u which is input to transmit filters/(mixers) 26. The CAP transceiver implementation does not have mixers, while the QAM transceiver implementation does have mixers, as seen in the respective systems depicted in FIGS. 1–2. The filtered (mixed) signal then gets transmitted over channel 28 wherein noise can be added as depicted at point 30, the noisy signal being received at receive filters/(mixers) which provides signal y, as described above. Carrier sensor 34 senses signal y and generates a respective start signal for channel estimator 36 and baud frequency offset estimator 38. Channel estimator 36 and baud frequency estimator 38 then perform the calculations as described above producing signals ĥ and S for use by decoder 40, which is also responsive to the y signals from receive filters/(mixer) 32.

Figure 7:
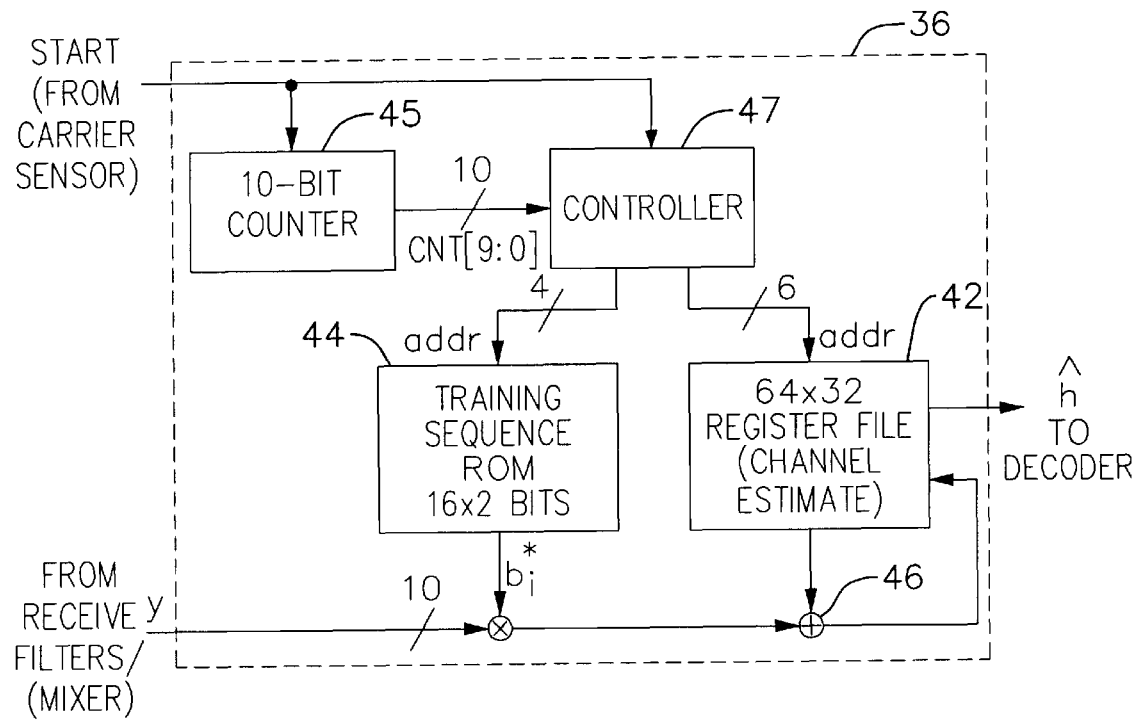
FIG. 7 shows in block diagram form a channel estimator in accordance with the present invention.

The circuit shown in FIG. 7 implements the channel estimation equation as performed by channel estimator 36. Channel estimate ĥ is computed from an input data stream y. The contribution of the current data sample to each of the channel estimate's sixty-four entries is computed as each value $y_i$ arrives. This is equivalent to performing a complex multiply between the input sample $y_1$ and a column of the B matrix above and adding its contribution into a vector of partial sums that hold the channel estimate that is being computed. For example, data sample $y_0$ is multiplied with the 64 entries of matrix B's column 0 and summed into a vector of 64 complex accumulators. Similarly, $y_1$ is multiplied with column 1 of B and summed into the result from the previous step. Once the results from 64 samples have been accumulated into the partial results the remaining 64 samples ($y_{64}$ through $y_{127}$) interact with columns 0 through 63 to add their contribution to the channel estimate.

64 entry by 32-bit memory (channel estimate register file) 42 holds the sixty-four real and imaginary 16-bit components of the channel estimate, $h_i = (h_{iR} + jh_{il})$, where j is the square root of negative one. 16 entry by 2-bit read-only memory (ROM) 44 is used to represent the training sequence, where the 2-bit $b_i$ are encoded as 00: +1, 01: +j, 10: −j, 11: −1. Due to the restricted values allowable for the $b_i$ the complex multiplier used to generate $z_i = y_i^* b_i$ is implemented with simple data swapping of the real/imaginary components of $y_i = (y_{iR} + jy_{il})$ followed by conditional negation, as per the table below:

| $b_i$ | $Z_{iR}$ | $Z_{il}$ |
|---|---|---|
| 00 | $+y_{iR}$ | $+y_{il}$ |
| 01 | $+y_{il}$ | $-y_{iR}$ |
| 10 | $-y_{il}$ | $+y_{iR}$ |
| 11 | $-y_{iR}$ | $-y_{il}$ |

This table also includes the additional step associated with conjugating the $b_i$ to form the elements of the matrix B. Two 16-bit adders 46 are used to sum the respective real and imaginary components of $z_i$ with the current contents of the $h_i$ accumulators. The updated accumulator outputs are written back to channel estimator memory 42, which holds the partial accumulators. During an initialization phase (the first 16 data samples after a new channel estimate is requested) the adders' outputs are bypassed and $h_i$ are set to $z_i$.

Controller 47 generates addresses for channel estimator memory 42 and training sequence ROM 44, as well as various control signals (initialization, etc.). 10-bit counter 45 generates an input to controller 47 at 16 times the sample rate. Training sequence ROM 44 is indexed by implementing a simple equation in hardware given CNT [9:0] (where CNT [3:0] marks a single input sample, and CNT [5:0] marks a symbol period). Training sequence ROM 44 is indexed by:

Index=CNT[9:6]−CNT[3:0]

where all arithemetic is modulo 16. Therefore, for the initial input sample CNT [9:4]=0, index will generate the address sequence 0, 15, 14, 13 . . . 1. After 4 input samples CNT [9:6]=1, the address sequence will be 1, 0, 15, 14 . . . 2. Channel estimate accumulator register file 42 is addressed (addr [5:0]) by permuting CNT [9:0], as per addr [5]=CNT [3]

addr [4]=CNT [2]

addr [3]=CNT [1]

addr [2]=CNT [0]

addr [1]=CNT [5]

addr [0]=CNT [4]

As such, controller 47 generates the addresses to implement equation:

$$\begin{bmatrix} h_0 \\ h_1 \\ h_2 \\ h_3 \\ h_4 \\ h_5 \\ h_6 \\ h_7 \\ \vdots \\ h_{60} \\ h_{61} \\ h_{62} \\ h_{63} \end{bmatrix} = \frac{1}{32} \begin{bmatrix} b_0^* & 0 & 0 & 0 & b_1^* & 0 & 0 & 0 & \ldots & b_{15}^* & 0 & 0 & 0 \\ 0 & b_0^* & 0 & 0 & 0 & b_1^* & 0 & 0 & \ldots & 0 & b_{15}^* & 0 & 0 \\ 0 & 0 & b_0^* & 0 & 0 & 0 & b_1^* & 0 & \ldots & 0 & 0 & b_{15}^* & 0 \\ 0 & 0 & 0 & b_0^* & 0 & 0 & 0 & b_1^* & \ldots & 0 & 0 & 0 & b_{15}^* \\ b_{15}^* & 0 & 0 & 0 & b_0^* & 0 & 0 & 0 & \ldots & b_{14}^* & 0 & 0 & 0 \\ 0 & b_{15}^* & 0 & 0 & 0 & b_0^* & 0 & 0 & \ldots & 0 & b_{14}^* & 0 & 0 \\ 0 & 0 & b_{15}^* & 0 & 0 & 0 & b_0^* & 0 & \ldots & 0 & 0 & b_{14}^* & 0 \\ 0 & 0 & 0 & b_{15}^* & 0 & 0 & 0 & b_0^* & \ldots & 0 & 0 & 0 & b_{14}^* \\ \vdots & \vdots & \vdots & \vdots & \vdots & \vdots & \vdots & \vdots & \ddots & \vdots & \vdots & \vdots & \vdots \\ b_1^* & 0 & 0 & 0 & b_2^* & 0 & 0 & 0 & \ldots & b_0^* & 0 & 0 & 0 \\ 0 & b_1^* & 0 & 0 & 0 & b_2^* & 0 & 0 & \ldots & 0 & b_0^* & 0 & 0 \\ 0 & 0 & b_1^* & 0 & 0 & 0 & b_2^* & 0 & \ldots & 0 & 0 & b_0^* & 0 \\ 0 & 0 & 0 & b_1^* & 0 & 0 & 0 & b_2^* & \ldots & 0 & 0 & 0 & b_0^* \end{bmatrix} \cdot \begin{bmatrix} y_0 + y_{64} \\ y_1 + y_{65} \\ y_2 + y_{66} \\ y_3 + y_{67} \\ y_4 + y_{68} \\ y_5 + y_{69} \\ y_6 + y_{70} \\ y_7 + y_{71} \\ \vdots \\ y_{60} + y_{124} \\ y_{61} + y_{125} \\ y_{62} + y_{126} \\ y_{63} + y_{127} \end{bmatrix}.$$

Address sequencing of the channel estimate registers utilizes knowledge of the structure of the matrix B to minimize the amount of computation necessary between the arrival of each data sample. The columns of matrix B are built from the sixteen training sequence elements each interleaved with three zeroes to form a 64-element column. Each $y_i$ when multiplied with its respective column will only make a contribution to sixteen out of the sixty-four channel estimate accumulators. So $y_0$ will be multiplied with $b_0^*$ and accumulated into $h_0$, with $b_{15}^*$ and accumulated into $h_4$, with $b_{14}^*$ and accumulated into $h_8$ etc.

This method of computing a channel estimate relies on the underlying computation clock being at least 16 times the sample clock frequency. This follows from noticing that each data sample only contributes to sixteen of the hi-accumulators. This also allows for handling the case where the computation clock is less than 16×the data clock. By de-multiplexing the input data stream by up to a factor of four and duplicating the complex multiplier/adder units the higher data rates can be accommodated.

Figure 8:
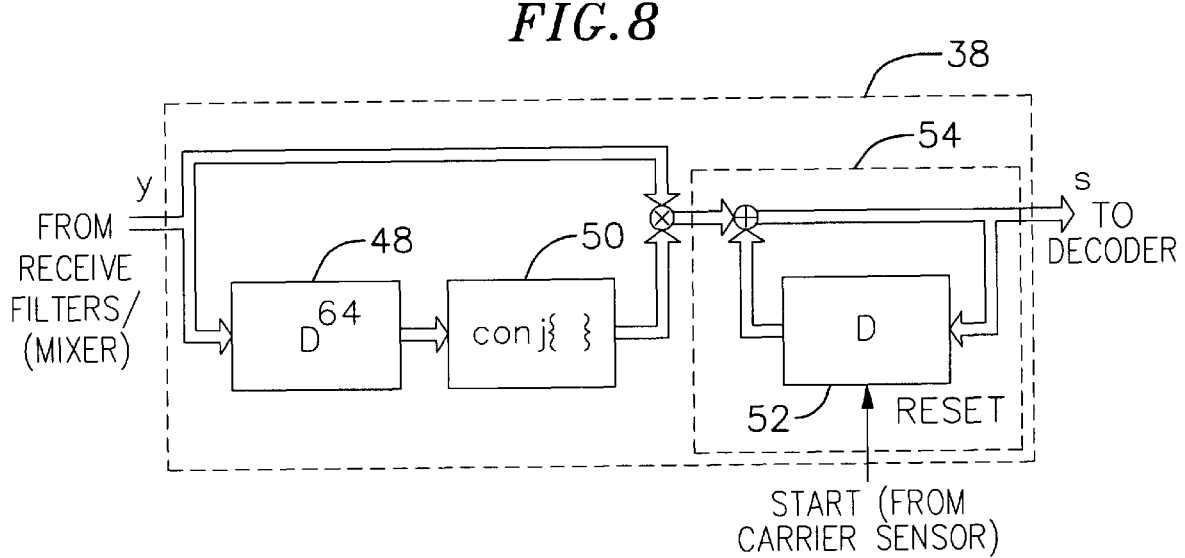
FIG. 8 shows in block diagram form a baud frequency offset estimator in accordance with the present invention.

The baud frequency offset is estimated using the same characterization signal used for channel estimation. The baud frequency offset $\Delta f_b$ can be estimated by the following equation:

$$S = \sum_{k=0}^{63} y_k y_{k+64}^*$$

$$\Delta f_b \cong \frac{\text{real}(S) \cdot f_b}{\text{imag}(S) \cdot f_c \cdot 32\pi}$$

wherein $f_b$ is the baud frequency and $f_c$ is the center frequency of the transmitted signal. One implementation of this calculation of S is shown in FIG. 8, depicting baud frequency offset estimator 38. Delay 48 is responsive to the y signal and performs a delay of 64 samples and is fed into complex conjugator 50. The output from complex conjugator 50 is multiplied with signal y and combined with a one sample delay provided by delay 52. The sum with delayed feedback comprises accumulator 54, resulting in signal S.

Baud rate estimator 38 works over the same y samples as channel estimator 36. As such, accumulator 54 would be initialized to zero by a start signal from carrier sensor 34 just prior to the first sample of the last copy of the preamble (i.e., sample $y_{64}$ in the channel estimation equations). The result is read out of the accumulator after sample $y_{127}$ arrives.

The above description is illustrative and not restrictive. Many variations of the invention will become apparent to those of skill in the art upon review of this disclosure. For example, different oversampling rates could be used with straightforward changes to the circuits shown, or the order of operations could be changed in a trivial manner to produce equivalent results.

What is claimed is:

1. A method of obtaining a channel estimate for a communications channel in a communications system, the communications system having a transmitter for transmitting to a receiver over the communications channel signals representing data appended to a preamble signal, the method comprising:

providing as the preamble signal a periodic plurality of preamble sequences, each preamble sequence containing 16 b symbols generated in accordance with:

$$\frac{1}{32}\sum_{k=0}^{15} b_k b^*_{\mathrm{mod}(k+n,16)} = \begin{cases} 1, & n=0 \\ 0, & n \neq 0 \end{cases};$$

sending a transmission signal representing the periodic plurality of preamble sequences prepended to the data over the communications channel to the receiver;
   receiving the transmission signal at the receiver as a received signal; and
   processing the received signal to determine from the received signal a channel estimate in accordance with:

$$\hat{h} = \frac{1}{64} B^H (y_1 + y_2)$$

wherein B represents a matrix of preamble symbol values, upsampled by four and zero-filled, and wherein $y_1$ and $y_2$ are column vectors of received samples representing the last two copies of a received preamble.

2. The method of claim 1, wherein the preamble signal has a periodic plurality of three preamble sequences.

3. The method of claim 1, wherein the preamble signal has a periodic plurality of four preamble sequences.

4. A method of obtaining a baud frequency offset estimate for a communications channel in a communications system, the communications system having a transmitter for transmitting to a receiver over the communications channel signals representing data appended to a preamble signal, the method comprising:
   providing as the preamble signal a periodic plurality of preamble sequences, each preamble sequence containing 16 b symbols generated in accordance with:

$$\frac{1}{32}\sum_{k=0}^{15} b_k b^*_{\mathrm{mod}(k+n,16)} = \begin{cases} 1, & n=0 \\ 0, & n \neq 0 \end{cases};$$

sending a transmission signal representing the periodic plurality of preamble sequences prepended to the data over the communications channel to the receiver;
   receiving the transmission signal at the receiver as a received signal; and
   processing the received signal to determine from the received signal a baud frequency offset estimate $\Delta f_b$ in accordance with:

$$S = \sum_{k=0}^{63} y_k y^*_{k+64}$$

$$\Delta f_b \cong \frac{\mathrm{real}(S) \cdot f_b}{\mathrm{imag}(S) \cdot f_c \cdot 32\pi}$$

wherein $f_b$ is a baud frequency and $f_c$ is a center frequency of the transmission signal.

5. The method of claim 4, wherein the preamble signal has a periodic plurality of three preamble sequences.

6. The method of claim 4, wherein the preamble signal has a periodic plurality of four preamble sequences.

7. A method of obtaining a channel estimate and a baud frequency offset estimate for a communications channel in a communications system, the communications system having a transmitter for transmitting to a receiver over the communications channel signals representing data appended to a preamble signal, the method comprising:
   providing as the preamble signal a periodic plurality of preamble sequences, each preamble sequence containing 16 b symbols generated in accordance with:

$$\frac{1}{32}\sum_{k=0}^{15} b_k b^*_{\mathrm{mod}(k+n,16)} = \begin{cases} 1, & n=0 \\ 0, & n \neq 0 \end{cases};$$

sending a transmission signal representing the periodic plurality of preamble sequences prepended to the data over the communications channel to the receiver;
   receiving the transmission signal at the receiver as a received signal;
   processing the received signal to determine from the received signal both:
     a) a channel estimate in accordance with:

$$\hat{h} = \frac{1}{64} B^H (y_1 + y_2)$$

wherein B represents a matrix of preamble symbol values, upsampled by four and zero-filled, and wherein $y_1$ and $y_2$ are column vectors of received samples representing the last two copies of a received preamble, and
     b) a baud frequency offset estimate $\Delta f_b$ in accordance with:

$$S = \sum_{k=0}^{63} y_k y^*_{k+64}$$

$$\Delta f_b \cong \frac{\mathrm{real}(S) \cdot f_b}{\mathrm{imag}(S) \cdot f_c \cdot 32\pi}$$

wherein $f_b$ is a baud frequency and $f_c$ is a center frequency of the transmission signal.

8. The method of claim 7, wherein the preamble signal has a periodic plurality of three preamble sequences.

9. The method of claim 7, wherein the preamble signal has a periodic plurality of four preamble sequences.

10. An apparatus for obtaining a channel estimate for a communications channel in a communications system, the communications system having a transmitter for transmitting to a receiver over the communications channel signals representing data appended to a preamble signal, the preamble signal having a periodic plurality of preamble sequences, each preamble sequence containing 16 b symbols generated in accordance with:

$$\frac{1}{32}\sum_{k=0}^{15} b_k b^*_{\mathrm{mod}(k+n,16)} = \begin{cases} 1, & n=0 \\ 0, & n \neq 0 \end{cases},$$

the receiver having a carrier sensor for detecting the start of the last two copies of a received preamble signal, the apparatus comprising:
   a channel estimate processor for processing the received signal to determine from the received signal the channel estimate $\hat{h}$ in accordance with:

$$\hat{h} = \frac{1}{64} B^H (y_1 + y_2)$$

wherein B represents a matrix of preamble symbol values, upsampled by four and zero-filled, and wherein $y_1$ and $y_2$ are column vectors of received samples representing the last two copies of a received preamble, the channel estimate processor being responsive to the carrier sensor to determine the start of the last two copies of the received preamble signal for starting the processing of the received signal to determine the channel estimate $\hat{h}$.

11. The apparatus of claim 10, wherein the preamble signal has a periodic plurality of three preamble sequences.

12. The apparatus of claim 10, wherein the preamble signal has a periodic plurality of four preamble sequences.

13. An apparatus for obtaining a baud frequency offset estimate $\Delta f_b$ for a communications channel in a communications system, the communications system having a transmitter for transmitting to a receiver over the communications channel signals representing data appended to a preamble signal, the preamble signal having a periodic plurality of preamble sequences, each preamble sequence containing 16 b symbols generated in accordance with:

$$\frac{1}{32}\sum_{k=0}^{15} b_k b^*_{\mathrm{mod}(k+n,16)} = \begin{cases} 1, & n=0 \\ 0, & n\neq 0 \end{cases},$$

the receiver having a carrier sensor for detecting the start of the last two copies of a received preamble signal, the apparatus comprising:

a baud frequency offset processor for processing the received signal to determine from the received signal the baud frequency offset estimate $\Delta f_b$ in accordance with:

$$S = \sum_{k=0}^{63} y_k y^*_{k+64}$$

$$\Delta f_b \cong \frac{\mathrm{real}(S) \cdot f_b}{\mathrm{imag}(S) \cdot f_c \cdot 32\pi}$$

wherein $f_b$ is a baud frequency and $f_c$ is a center frequency of the transmission signal, the baud frequency offset processor being responsive to the carrier sensor to determine the start of the last two copies of the received preamble signal for starting the processing of the received signal to determine the baud frequency offset estimate $\Delta f_b$.

14. The apparatus of claim 13, wherein the preamble signal has a periodic plurality of three preamble sequences.

15. The apparatus of claim 13, wherein the preamble signal has a periodic plurality of four preamble sequences.

16. An apparatus for obtaining both a channel estimate $\hat{h}$ and a baud frequency offset estimate $\Delta f_b$ for a communications channel in a communications system, the communications system having a transmitter for transmitting to a receiver over the communications channel signals representing data appended to a preamble signal, the preamble signal having a periodic plurality of preamble sequences, each preamble sequence containing 16 b symbols generated in accordance with:

$$\frac{1}{32}\sum_{k=0}^{15} b_k b^*_{\mathrm{mod}(k+n,16)} = \begin{cases} 1, & n=0 \\ 0, & n\neq 0 \end{cases},$$

the receiver having a carrier sensor for detecting the start of the last two copies of a received preamble signal, the apparatus comprising:

a channel estimate processor for processing the received signal to determine from the received signal the channel estimate $\hat{h}$ in accordance with:

$$\hat{h} = \frac{1}{64} B^H (y_1 + y_2)$$

wherein B represents a matrix of preamble symbol values, upsampled by four and zero-filled, and wherein $y_1$ and $y_2$ are column vectors of received samples representing the last two copies of a received preamble; and a baud frequency offset processor for processing the received signal to determine from the received signal the baud frequency offset estimate $\Delta f_b$ in accordance with:

$$S = \sum_{k=0}^{63} y_k y^*_{k+64}$$

$$\Delta f_b \cong \frac{\mathrm{real}(S) \cdot f_b}{\mathrm{imag}(S) \cdot f_c \cdot 32\pi}$$

wherein $f_b$ is a baud frequency and $f_c$ is a center frequency of the transmission signal;

the channel processor and the baud frequency offset processor each being responsive to the carrier sensor to determine the start of the last two copies of the received preamble signal for starting the processing of the received signal to determine the channel estimate $\hat{h}$ and the baud frequency offset estimate $\Delta f_b$.

17. The apparatus of claim 16, wherein the preamble signal has a periodic plurality of three preamble sequences.

18. The apparatus of claim 16, wherein the preamble signal has a periodic plurality of four preamble sequences.

* * * * *